Patented Mar. 28, 1950

2,502,114

UNITED STATES PATENT OFFICE 2,502,114

PROCESS FOR PREPARING MONONITROFURAN COMPOUNDS

Michael Witte, Albany, and Charles J. Lind, Buffalo, N. Y., assignors to Allied Chemical & Dye Corporation, New York, N. Y., a corporation of New York No Drawing. Application November 18, 1947, Serial No. 786,806

12 Claims. (Cl. 260—345)

1

This invention relates to the nitration of furan compounds and more particularly to an improved process for preparing mononitro derivatives of furan and substituted furan compounds having a replaceable hydrogen atom in at least one of the alpha positions on the furan ring.

In the past, mononitrofuran compounds have been prepared by treating furan, or a substituted furan compound such as furfural, 3-methylfuran or the like, with fuming nitric acid in a reaction medium comprising acetic anhydride. This process resulted in relatively low yields of nitrofuran compounds, of the order of 33% or less of theoretical.

It is an object of the present invention to provide an improved process for the preparation of mononitrofuran compounds.

It is a further object of the invention to provide a process for preparing mononitrofuran compounds in higher yields than those obtained in prior art processes.

A still further object is to provide a process for preparing 5-nitro-2-furanmethanediol diacetate in yields higher than have heretofore been obtained.

These and other objects are accomplished according to our invention wherein the nitration of furan and substituted furans containing a replaceable hydrogen atom in at least one of the alpha positions is carried out by the treatment of the furan compound with a nitrating agent in an acetic anhydride medium in the presence of a phosphorus compound such as phosphorus oxides, phosphorus chlorides and phosphorus bromides.

The resulting mononitrofuran compounds are useful as antiseptics and as intermediates in the preparation of therapeutic materials. Particularly useful for the latter purpose are 5-nitrofurfural and 5-nitro-2-furanmethanediol diacetate.

In carrying out the process according to our invention, the furan compound may be subjected to nitration in any desired suitable manner. For example, the nitration may be carried out by first preparing a nitrating mixture containing the nitrating agent, the catalyst and the acetic anhydride reaction medium, and adding the furan compound thereto; or the furan compound may be mixed with the acetic anhydride and the nitrating agent may then be introduced into this mixture; or other suitable variations may be employed. In any case, the mixtures should be prepared at low temperatures below about 10° C. preferably between about minus 5° C. and +5° C.,

2 and maintained at these temperatures throughout the nitration reaction.

In carrying out the process according to the preferred method of our invention, the furan compound is charged into a cooled reaction vessel with acetic anhydride, together with the particular phosphorus compound used as catalyst. The cooled reaction mixture is agitated while continuing the cooling, preferably to between about minus 5° C. and +5° C., until the charge is thoroughly mixed. Then, the nitrating agent, such as nitric acid is introduced slowly while continuing the agitation and maintaining the temperature of the mass preferably at about minus 5° C., by suitable cooling means, for example by the periodic addition of solid carbon dioxide. After the addition of all the nitrating agent, agitation and cooling of the mixture are continued until the reaction is substantially complete. Then the mixture is transferred with vigorous agitation into an ice-water mixture, allowed to stratify, and the stratified oil is separated from the water.

The viscous oil thus obtained is then neutralized, for example, with sodium hydroxide solution, containing if desired a water immiscible liquid organic solvent for the nitro compound formed, such as monochlorobenzene to prevent "doughing up" of the oil while maintaining the reaction mixture at a relatively low temperature, for example about 10° C. Other solvents which may be used for this purpose are benzene, toluene, o-dichlorobenzene, nitrobenzene and the like. The mass thus obtained is allowed to stand and stratify into two layers, an aqueous layer and an oil layer. The oil layer, containing the nitro product, is separated. Furan compounds of certain types may yield, on nitration in acetic anhydride, an open chain nitro compound. Such fission products, if they occur, may be closed at this stage by stirring the oil slowly into a mixture of a nitrogen base compound such as pyridine, with alcohol and water, while maintaining the temperature below about 35° C. The mixture is agitated at this temperature for a period sufficient to permit the reaction to go to substantial completion, and in the case of crystalline compounds, is then cooled to about 0° C. and maintained at this temperature for several hours to promote crystallization. The crystals may then be separated in any desired manner as by filtration. The crude nitrofuran compound may be purified, if desired, by boiling with alcohol, treatment with decolorizing carbon and recrystallization. Other nitrofuran compounds such as 5-nitro-2-furfuryl chloride and 5-nitro-2-furfurylmethyl ether, which are yellowish oils at ordinary temperatures may be recovered in any desired suitable manner such as by decantation, centrifugation or the like. Yields of the order of 35 to 45% of theoretical are obtained, and in every case, higher yields are obtained than when the corresponding furan compound is nitrated according to a similar process from which the phosphorus compound is omitted.

In the nitration of furan compounds generally, according to the process of our invention above described, a mononitro compound is formed and the nitro group enters an alpha position. In the case of the mono-nitration of an alpha substituted furan compound such as the aldehyde, etc., the nitro group enters the opposite "alpha" position. However, if the furan ring of the compound to be nitrated contains a substituent in a beta position, the nitro group enters the alpha position which is contiguous to the beta substituent if that is the only unsubstituted alpha position in the furan ring, or if the beta substituent is one which in benzene is ortho, para directing; but if the group in the beta position is one which in benzene is largely meta directing, then the substituent assumes the more distant, or opposite alpha position. Thus the nitration of:

(a) Furan produces 2-nitrofuran;
(b) Furfural produces 5-nitrofurfural (in the form of the diacetate);
(c) 2- or α-methylfuran produces 5-nitro-2-methylfuran;
(d) 3- or β-methylfuran produces 2-nitro-3-methylfuran;
(e) Ethyl-3-furoate produces ethyl-2-nitro-4-furoate;
Etc.

The direct nitration of furan compounds as described, produces either the mononitrated derivative of the furan compound treated or the diacetate of the nitrofuran compound depending on the character of the substituents on the furan ring of the compound used. Thus, upon introduction of furfural into the acetic anhydride medium or into a nitrating medium containing acetic anhydride, apparently the diacetate is first formed, which is then nitrated to the 5-nitrofurfurylidene diacetate, i. e. 5-nitro-2-furanmethanediol diacetate. The diacetate may be converted to the corresponding nitrofuran compound, e. g. 5-nitrofurfural, by hydrolysis. For some purposes a nitrofuran compound and its corresponding diacetate form equally useful intermediates. Compounds whose substituents are not susceptible to acetylation, for example the methylfurans, are converted directly into the corresponding nitrofuran compounds, e. g. 5-nitro-2-methylfuran, 2-nitro-3-methylfuran, etc. by nitration in the acetic anhydride medium.

The process according to our invention is adapted to be used in the nitration of any furan compound which has at least one replaceable hydrogen in an alpha position on the furan ring. It is particularly useful in the nitration of compounds of the character illustrated by the structural formula

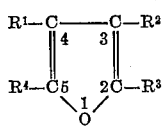

wherein $R^1$ and $R^2$ are members selected from the group consisting of hydrogen and alkyl groups; and $R^3$ and $R^4$ are members selected from the group consisting of hydrogen, aldehyde groups, alkyl, alkoxymethyl, acyloxymethyl, di(acyloxy)methyl, carboxy, carbalkoxy, halogen and halogen-substituted alkyl groups, at least one of which is hydrogen.

In Table I following, some furan compounds falling within the scope of the above formula are listed in column I and the corresponding nitrofuran compounds which may be prepared therefrom according to the process of our invention are listed in column II.

TABLE I

| I<br>Furan Compound | II<br>Nitrofuran Compound |
|---|---|
| furan | 2-nitrofuran |
| furfural | 5-nitrofurfural |
| furfuryl acetate | 5-nitrofurfuryl acetate |
| 2-furanmethanediol diacetate | 5-nitro-2-furanmethanediol diacetate |
| 2-methylfuran | 5-nitro-2-methylfuran |
| 3-methylfuran | 2-nitro-3-methylfuran |
| furfurylmethyl ether | 5-nitrofurfurylmethyl ether |
| 2-ethylfuran | 5-nitro-2-ethylfuran |
| 3-propylfuran | 2-nitro-3-propylfuran |
| 2-chlorofuran | 2-chloro-5-nitrofuran |
| furfuryl chloride | 5-nitrofurfuryl chloride |
| 2-furoic acid | 2-nitro-5-furoic acid |

The phosphorus compounds which may be used as nitrating assistants in carrying out our invention, include the chlorides such as phosphorus trichloride, phosphorus pentachloride and phosphorus oxychloride; the bromides such as phosphorus tribromide, pentabromide and oxybromide; and also the oxides such as phosphorus pentoxide, tetroxide and trioxide.

The phosphorus compounds are effective as assistants in the nitrating reaction in amounts which bear a wide range of proportions in relation to the furan compound which is to be nitrated. In the case of phosphorus pentoxide, the use of amounts ranging from 1 to 50% of the weight of the furan compound produces substantially improved yields of nitrofuran compound as indicated by Table II below.

TABLE II

*Increase in yields of 5-nitro-2-furanmethanediol diacetate using varying amounts of $P_2O_5$ in nitration of furfural with fuming nitric acid (sp. gr. 1.5) in acetic anhydride*

| Grams $P_2O_5$ per gram mol of furfural (96 grams) | Yield of 5-nitrofuranmethanediol diacetate | |
|---|---|---|
| | Per Cent of Theoretical | Per Cent Increase |
| none | 19 | |
| 1 | 26 | 36.8 |
| 5 | 30 | 58.0 |
| 10 | 38 | 100 |
| 25 | 35 | 84.2 |
| 35 | 25 | 31.5 |
| 47 | 26 | 36.8 |

In a similar nitration, phosphorus trichloride appears to provide more uniformly, an increase in yield regardless of quantity used. Thus, the use of an amount of $PCl_3$ corresponding to 3% of the weight of furfural produces substantially the same yield of 5-nitro-2-furanmethanediol diacetate as does an amount equal to 15%. The surprisingly increased yield thus obtained is about 40%, compared to about 19% of theory, when no phosphorus compound is used. However, the use of an amount of $PCl_3$ which is at least 5% and especially about 10% of the weight of the furfural provides a smoother and more easily controllable reaction than smaller proportions of this assistant.

In general we prefer to use quantities of phosphorus compound ranging from about 5% to about 30% of the weight of the furan compound, although larger or smaller proportions can be used effectively if desired.

As the nitrating agent we prefer to use nitric acid, either in the form of an aqueous nitric acid solution, of which at least 89% is nitric acid by weight, or a mixed acid, for example a commercial mixture of sulfuric acid, nitric acid and water which contains not more than 20% water, or an aqueous nitric acid such as a commercial concentrated nitric acid which contains not more than 50% water, provided such mixed acid or concentrated nitric acid is dewatered by admixture of a sufficient amount of phosphorus compound, to leave a residue of water which does not exceed about one-ninth of the weight of nitric acid in the fortified aqueous nitric acid, or of the total weight of sulfuric and nitric acids in the fortified mixed acid. In any case, the nitrating acid should contain not more than about 11% water based on the total weight of nitrating acid after concentration.

The quantity of nitrating agent used may be varied, but should contain at least the stoichiometric amount of nitric acid necessary to form the mononitrofuran compound. In general, the amount of nitric acid used may be between 1.1 mols and 2 mols per mol of furan compound used, and preferably between about 1.8 and 1.9 mols of nitric acid per mol of furan compound.

The temperature of nitration should be maintained below about 10° C., preferably between about minus 5° and 5° C. Lower temperatures appear to provide no yield benefits, and are less practicable because of the greater amount of cooling required. Temperatures above about 10° C. are undesirable since, if the nitro product is allowed to warm up to 10–20° C. a violent exothermic and destructive reaction sets in spontaneously and results in serious decomposition and carbonation of the product.

The following specific examples will serve further to illustrate my invention. Parts indicated are by weight.

EXAMPLE 1

1971 parts by weight of acetic anhydride, 288 parts of recently distilled furfural, and 29 parts of phosphorus trichloride were charged to a glass flask cooled to minus 5° C. by means of an external ice-salt bath, and the mixture was agitated at minus 5° C. for about 15 minutes. 391 parts of fuming nitric acid (sp. gr. 1.5) were then introduced during about 1¼ hours with good agitation while maintaining the temperature at minus 5° C. by addition of solid carbon dioxide. After addition of the nitric acid was complete, the reaction mass was further agitated at minus 5° C. for ½ hour to complete the reaction, and then it was stirred vigorously into a mixture of 1900 parts of ice and 2300 parts of water. The mass was stratified, and the lower layer of oil was separated from the aqueous layer and maintained at about 0 to 5° C. with ice. The latter was agitated with 400 parts of ice and 1200 parts of water and the resulting mixture was allowed to stand, and the oil which separated was combined with the main oil fraction.

The oil thus obtained was neutralized by introducing it into an agitated mixture of 517 parts of 50% aqueous sodium hydroxide, 2000 parts of water and 167 parts of monochlorobenzene while maintaining the temperature below 10° C. by the addition of ice. The mass thus obtained was allowed to stand at a temperature not exceeding 10° C., and to separate into an upper aqueous layer and a lower layer of oil. The oil layer was stirred into a mixture of 242 parts of pyridine, 1080 parts of 2B alcohol and 450 parts of water, during about 15 minutes without permitting the temperature to exceed 35° C. (normally the heat of reaction raises the temperature from that of the room only to about 30° C., obviating the necessity of external cooling). The mixture was agitated at below 35° C. for 1 hour thereafter, and then cooled to 0° C. for several hours to promote crystallization. The crystals were separated as a cake of filtration, and washed 5 times with cold water using 1200 parts of water per wash.

The crude 5-nitro-2-furanmethanediol diacetate thus obtained was purified by agitating it with 240 parts of 2B alcohol for 1 hour at about 25° C., cooling the slurry to 0° C., and filtering. The filter cake was boiled for about 10 minutes with 1200 parts of 2B alcohol containing 35 parts of decolorizing carbon. The mass was sludge-filtered, and the sludge cake was washed with 120 parts of hot alcohol. The filtrate was cooled to 0° C. during about 1 hour, maintained at 0° C. for 1 hour, and filtered, and the filter cake was dried at 60° C. and ground to a powder.

The purified 5-nitro-2-furanmethanediol diacetate thus obtained was a white powder melting at 91.5° C., and amounted to 315.5 parts, corresponding to 43% of the theoretical yield from furfural.

When the foregoing reaction was carried out in the absence of phosphorus trichloride but under otherwise similar conditions, only 135 parts of product were obtained, corresponding to less than 19% of the theoretical yield of 5-nitro-2-furanmethanediol diacetate.

EXAMPLE 2

30 parts of phosphorus pentoxide were employed in place of phosphorus trichloride in the preceding example, and the reaction and processing were carried out in otherwise similar manner. 277.5 parts, corresponding to 38% of the theoretical yield, of 5-nitro-2-furanmethanediol diacetate melting at 91° C. were obtained.

EXAMPLE 3

657 parts of acetic anhydride, 96 parts of recently distilled furfural, and 10.8 parts of phosphorus oxychloride were charged to a glass flask cooled to about minus 5° C. by means of an external ice-salt bath. 130 parts of fuming nitric acid (sp. gr. 1.5) were then introduced during about 1 hour with agitation while maintaining the temperature at minus 5° C. by addition of solid carbon dioxide. The reaction mass was further agitated for about ½ hour, and then stirred vigorously into a mixture of about 630 parts of ice and about 930 parts of water. The resulting mixture was allowed to stand at 0° to 5° C., and the lower layer of oil was withdrawn. The oil thus obtained was neutralized by introducing it into an agitated mixture of 172 parts of 50% aqueous sodium hydroxide, 700 parts of water and 83 parts of monochlorobenzene at a temperature not exceeding 10° C. The resulting mass was stratified at a temperature not above 10° C., and the resulting lower layer of oil was withdrawn and introduced into a mixture of 80 parts of pyridine, 360 parts of 2B alcohol and 150 parts of water during about 15 minutes, during which the temperature was not allowed to rise above 35° C. The mixture was agitated at below 35° C. for about 1 hour, cooled to 0° C. for several hours, and filtered, and the filter cake was washed 5 times with cold water using 400 parts of water per wash.

The crude 5-nitro-2-furanmethanediol diacetate thus obtained was purified by agitating it with 80 parts of 2B alcohol for 1 hour at about 25° C., cooling to 0° C., and filtering the slurry. The filter cake was then boiled with 400 parts of 2B alcohol containing about 10 parts of decolorizing carbon for about 10 minutes, after which the mass was sludge-filtered and the sludge cake was washed with about 40 parts of hot 2B alcohol. The filtrate was cooled, and about 70 parts of Skellysolve B (a light petroleum distillate boiling from 55° to 70° C.) were added to facilitate crystallization of the nitrocompound. The mass was cooled to 0° C. for several hours, and filtered, and the filter cake was dried at 60° C. and ground to a powder.

85 parts corresponding to 35% of the theoretical yield of 5-nitro-2-furanmethanediol diacetate melting at 91° C. were thus obtained.

EXAMPLE 4

96 parts by weight of furfural, 657 parts of acetic anhydride and 35 parts of $P_2O_5$ were charged into a glass flask cooled to about minus 5° C. with an ice-salt bath. 173 parts of 70/20 mixed acid (containing 70% $HNO_3$, 20% $H_2SO_4$ and 10% $H_2O$ by weight) were added during 1 hour at minus 5° C. with agitation, and the reaction mass was further stirred at minus 5° C. for 30 minutes. The flask contents were then poured into a mixture of about 600 parts of ice, 900 parts of water and 220 parts of monochlorobenzene, the latter being added to extract the intermediate product from aqueous suspension and thereby facilitate separation. The resulting mixture was allowed to stand at 0° to 5° C., and the chlorobenzene or oil layer was withdrawn. The oil was neutralized by stirring it into a mixture of about 170 parts of 50% aqueous sodium hydroxide, 700 parts of water and 55 parts of chlorobenzene at a temperature not exceeding 10° C. The oil layer obtained on standing was withdrawn and introduced in 15 minutes into a mixture of about 80 parts of pyridine, 360 parts of alcohol and 150 parts of water at a temperature not exceeding 35° C. The mass was then treated with about 200 parts of Skellysolve B to facilitate precipitation of the product, cooled to 0° C. for several hours, and filtered, and the cake was washed five times with cold water, using about 400 parts of water per wash.

62 parts of crude product were obtained. The foregoing amount of crude 5-nitro-2-furanmethanediol diacetate corresponds to about 50 grams of product purified by recrystallization from alcohol, or about 21% of the theoretical yield.

When an attempt was made to repeat the reaction in the absence of $P_2O_5$ or other phosphorus promoter, but under otherwise similar conditions, a violent exothermic reaction ensued after only about 15 to 30 parts of mixed acid had been added, yielding a black, tarry reaction mass.

As pointed out above, the 5-nitro-2-furanmethanediol diacetate as described in the examples is useful as an intermediate in the preparation of therapeutic compounds.

However, if desired, the diacetates may be converted into nitrofurfural by acid hydrolysis, for example by refluxing in an atmosphere of carbon dioxide with constant stirring in a solution of concentrated sulfuric acid for about fifteen minutes, then cooling, extracting with ether, washing the extract with water, drying over sodium sulfate and distilling.

While the above describes the preferred embodiments of our invention it will be understood that departures may be made therefrom within the scope of the specification and claims.

We claim:

1. In a process for preparing mononitrofuran compounds, the steps which comprise subjecting a furan compound having a replaceable hydrogen atom in at least one of the alpha positions on the furan ring, dissolved in an acetic anhydride medium, to the action of a nitrating agent in the presence of a phosphorus compound selected from the group consisting of phosphorus chlorides, phosphorus bromides, phosphorus oxides, phosphorus oxychloride and phosphorus oxybromide at temperatures below about 10° C. and recovering the mononitrofuran compound.

2. The process of claim 1, wherein the nitrating agent is nitric acid.

3. The process of claim 2, wherein the nitric acid is aqueous nitric acid having a concentration of at least about 89% by weight of nitric acid.

4. The process of claim 1, wherein the nitrating agent is a mixed acid containing nitric acid, sulfuric acid and not more than about 11% of water.

5. The process of claim 1, wherein the phosphorus compound is phosphorus trichloride.

6. The process of claim 1, wherein the phosphorus compound is phosphorus pentoxide.

7. The process of claim 1, wherein the phosphorus compound is phosphorus oxychloride.

8. In a process for preparing 5-nitro-2-furanmethanediol diacetate, the steps which comprise dissolving furfural in acetic anhydride, and subjecting said solution to the action of nitric acid in the presence of a phosphorus compound selected from the group consisting of phosphorus chlorides, phosphorus bromides, phosphorus oxides, phosphorus oxychloride and phosphorus oxybromide at temperatures below about 10° C. and recovering the 5-nitro-2-furanmethanediol diacetate.

9. The process of claim 8, wherein the phosphorus compound is phosphorus trichloride.

10. In a process for preparing 5-nitro-2-furanmethanediol diacetate, the steps which comprises subjecting a solution in acetic anhydride, of 2-furanmethanediol diacetate to the action of nitric acid in the presence of a phosphorus compound selected from the group consisting of phosphorus chlorides, phosphorus bromides, phosphorus oxides, phosphorus oxychloride and phosphorus oxybromide at temperatures below about 10° C. and recovering the 5-nitro-2-furanmethanediol diacetate.

11. In a process for preparing 5-nitro-2-furfural the steps which comprise dissolving furfural in acetic anhydride, subjecting said solution to the action of nitric acid in the presence of a phosphorus compound selected from the group consisting of phosphorus chlorides, phosphorus bromides, phosphorus oxides, phosphorus oxychloride and phosphorus oxybromide at temperatures below about 10° C., and subjecting the 5- nitro-2-furanmethanediol diacetate thus formed to acid hydrolysis to liberate 5-nitro-2-furfural.

12. A process for preparing 5-nitro-2-furanmethanediol diacetate which comprises dissolving furfural in acetic anhydride, adding thereto between about 5% and 10% of phosphorus trichloride based on the furfural, cooling the mixture while agitating, to a temperature between about minus 5° and 5° C., slowly adding thereto a quantity of nitric acid of a concentration of at least about 89%, equivalent to between 1.8 and 1.9 mols per mol of furfural, while continuing the agitation and while maintaining the temperature of the mixture at about minus 5° C., continuing the agitation after the addition of all the nitric acid until the reaction is complete, recovering the oily product thus formed, treating said oily product with pyridine in the presence of alcohol and water while maintaining the temperature below about 35° C., and thereafter recovering crystalline 5-nitro-2-furanmethanediol diacetate.

MICHAEL WITTE.
CHARLES J. LIND.

REFERENCES CITED

The following references are of record in the file of this patent:

UNITED STATES PATENTS

| Number | Name | Date |
|---|---|---|
| 2,057,076 | Wyler | Oct. 13, 1936 |
| 2,370,558 | Mares et al. | Feb. 27, 1945 |

OTHER REFERENCES

Gilman et al.: Journal of American Chemical Society, vol. 52, pages 2550-51.

Gilman et al.: Journal of American Chemical Society, vol. 56, pages 464-465.

Chem. Abstracts, vol. 31, page 5772.